United States Patent [19]
Wotring

[11] Patent Number: 5,368,210
[45] Date of Patent: Nov. 29, 1994

[54] CARGO STORAGE APPARATUS

[76] Inventor: Randall C. Wotring, 9824 Blackburn, Livonia, Mich. 48150

[21] Appl. No.: 928,491

[22] Filed: Aug. 11, 1992

[51] Int. Cl.⁵ .................................................. B60P 1/64
[52] U.S. Cl. ...................... 224/42.46 R; 224/318; 224/329
[58] Field of Search ............. 224/42.46 R, 42.42, 224/42.01, 311, 314, 318, 329, 330, 331

[56] References Cited

U.S. PATENT DOCUMENTS

| | | |
|---|---|---|
| 884,772 | 4/1908 | Sorenson . |
| 999,897 | 8/1911 | Smith . |
| 1,194,943 | 8/1916 | Broling . |
| 2,628,806 | 2/1953 | O'Brien . |
| 2,835,425 | 5/1958 | Shultz ................ 224/42.46 R |
| 3,552,613 | 1/1971 | Nye ................... 224/42.46 R |
| 4,560,096 | 12/1985 | Lucas et al. ............. 224/42.42 |
| 4,685,646 | 8/1987 | Harrison . |
| 4,718,583 | 1/1988 | Mullican ................ 224/42.42 |

FOREIGN PATENT DOCUMENTS

| | | | |
|---|---|---|---|
| 2633467 | 2/1978 | Germany | 224/42.46 R |
| 1296880 | 11/1972 | United Kingdom | 224/311 |

*Primary Examiner*—Renee S. Luebke
*Attorney, Agent, or Firm*—Brooks & Kushman

[57] ABSTRACT

A cargo storage apparatus that is secured to the side walls of a pick-up flatbed truck. A netting is attached to a hanger rod via a series of rings. Affixed onto the hanger are a set of hooks. Alternatively, handles may be sewn directly into the netting with hooks fastened to extensions of the netting. A set of clamps are secured to the overhang portion of a truck's sidewalls. Each clamp has an aperture which corresponds with a hook on the hanger rods or a hook connected to an extension of the netting. Once assembled, a large cargo storage area is provided. A divider member may be used to separate the storage area into sub-compartments. The apparatus can be quickly and easily installed without damage to the side walls of the truck and may be collapsed for compact storage. The use of handles enables easy removal and transport of the apparatus while containing cargo therein.

9 Claims, 3 Drawing Sheets

CARGO STORAGE APPARATUS

BACKGROUND OF THE INVENTION

The present invention is directed generally to a cargo storage apparatus and, more particularly, to a device which may be affixed to the walls of a bed of a pick-up truck to provide a flexible and adjustable basket for the storage and securement of cargo that would otherwise slide and shift about the bed of the truck.

In the use of vehicles which have flatbeds with side walls, such as a pick-up truck or the like, the flatbed of the truck is typically used to store and secure various types of articles and cargo. Such articles include camping, beach and fishing gear, sporting equipment, school and work materials, as well as groceries. There are a variety of devices which are designed specifically for the storage of other articles. Examples of such devices include heavy duty tools, storage boxes and firearm racks. These other devices often include rigid and non-adjustable storage areas which are often bolted and permanently affixed to the truck. However, none of these prior art devices provide a flexible and adjustable storage apparatus that may be easily and quickly affixed to the walls of a truck without the need for permanent connection. None of these devices can be easily removed and transported while cargo remains inside. Further, these prior art devices cannot be disassembled and collapsed or folded for storage in a relatively small space.

SUMMARY OF THE INVENTION

The present invention is directed to a novel and unique cargo storage apparatus which is quickly and easily connected to the cargo bed walls of a pick-up truck without the need for permanent affixation to the truck bed by the use of rivets, screws, bolts or other relatively permanent fasteners.

The cargo storage apparatus of the present invention includes a container adapted to hold cargo that is disposed in the flatbed of a truck that has side walls. The container may be flexible netting or the like. A set (preferably four) clamps are affixed to the overhang lips of the facing side walls of the truck. The cargo container may have a bar affixed to its opposing ends which may have hooks affixed thereon. Alternatively, handles may be sewn into the container with hooks connected to extensions of material of the container. The hooks engage with apertures disposed within each of the clamps affixed to the sidewalls of the truck. When properly arranged on the side walls, the clamps line up with the hooks present on the bar or extensions of the container material. When all hooks are engaged with their respective apertures in the clamps and buckles are adjusted, the upper portion of the container becomes taut allowing for the remainder of the container to form the desired storage area.

In accordance with a particularly preferred embodiment of the present invention, the cargo storage apparatus is preferably manufactured of flexible nylon netting which may be easily folded and stored in a relatively small space. The present invention may also include a flexible plastic coating applied to the lower portion of the container to increase product life and durability as well as prevent the container from sliding about the bed of the truck.

It is an object of the invention, therefore, to provide a novel and unique cargo storage apparatus for vehicles.

A further object of the invention is to provide a cargo storage apparatus which may be easily and quickly affixed to the walls of a truck.

It is still a further object of the present invention to provide a cargo storage apparatus which may be connected to the walls of a truck without the need for drilling and the use of permanent affixation means such as rivets or screws.

Yet another object of the present invention is to provide a cargo storage apparatus which may be compressed when not in use to enable compact storage.

Another object of the invention is to provide a cargo storage apparatus that may be installed without any damage to the vehicle.

A further object of the invention is to provide a cargo storage apparatus where its overall size and size of its internal compartments can be varied.

A further object of the invention is to provide a cargo storage apparatus with comfortable handles to enable convenient removal and transport of cargo.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

FIG. 8 is a side perspective view of an alternative embodiment of the present invention where the lower portion of the netting of the cargo storage apparatus is covered with protective plastic or the like.

DETAILED DESCRIPTION OF THE PREFERRED EMBODIMENT

Figure 1:
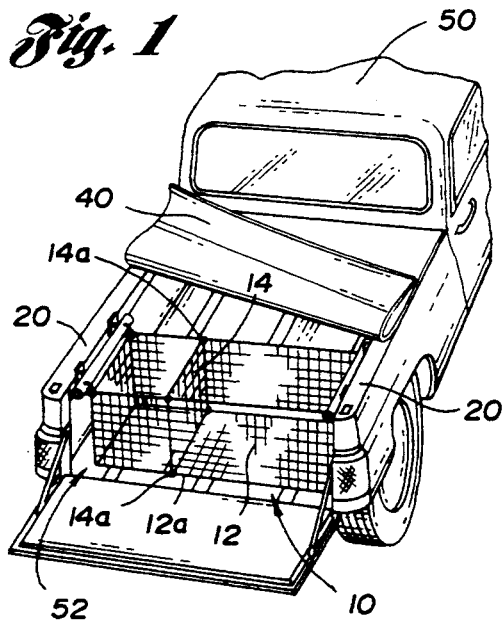
FIG. 1 is a perspective view of the the cargo storage apparatus of the present invention, showing the invention installed in the flatbed region of a pick-up truck.
Figure 2:
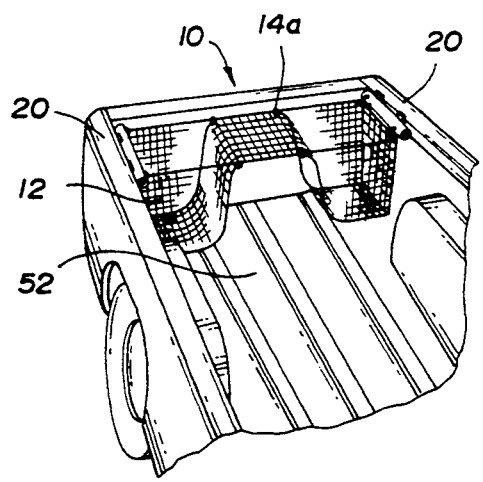
FIG. 2 is perspective view of the present invention from the front of the truck showing an alternative embodiment.

With reference now to FIGS. 1 and 2, the cargo storage apparatus of the present invention is illustrated and designated generally as 10. In FIG. 1, the cargo storage apparatus 10 is shown installed into the flatbed region of a pick-up type truck 50. The netting region 12 of the apparatus is shown to create a three-dimensional rectangular volume with the longer side spanning the width of the bed of the truck 50 between side walls 20. The invention has dimensions such that the lower region 12a of netting 12 may touch the floor 52 of truck 50. When the apparatus is filled with cargo, the side walls and floor of the truck provide support for the apparatus. It is preferable that netting 12 be manufactured of flexible nylon.

Figure 3:
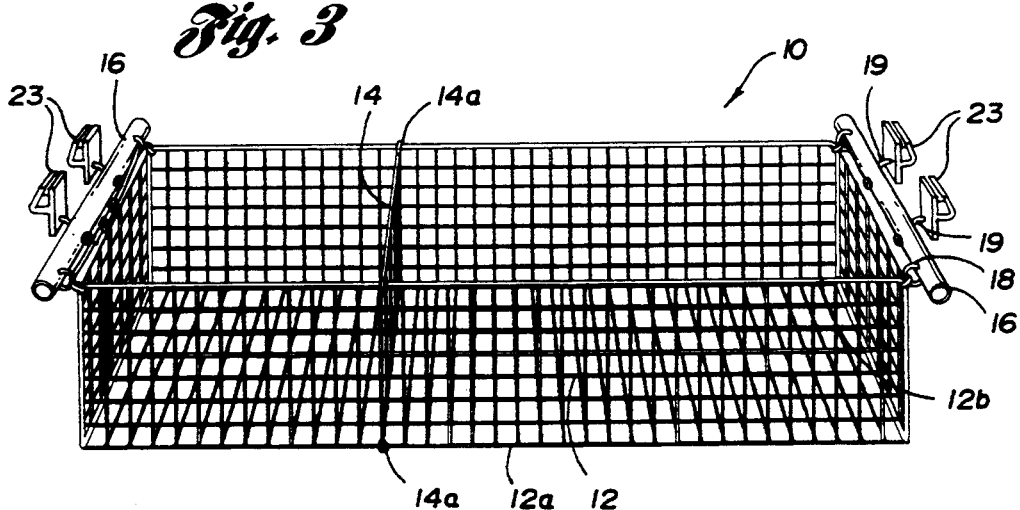
FIG. 3 is a side perspective view of an embodiment of the cargo storage apparatus of the present invention showing the invention removed from the vehicle with the divider member in place within the apparatus.
Figure 9:
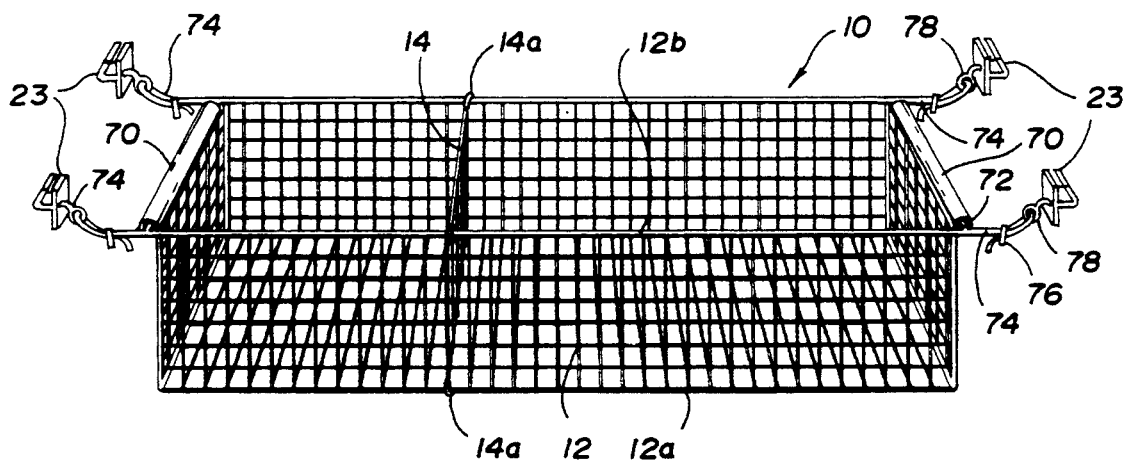
FIG. 9 is a side perspective view of the preferred embodiment of the cargo storage apparatus of the present invention.

As shown in FIG. 3, the netting 12 may be connected to truck side walls 20 via hanger rods 16 which are connected to the opposing sides of netting 12 by a set of rings 18. Connected to each hanger rod 16 is a set of hooks 19 which engage with clamps 23 which are securely affixed to the side walls 20. As shown in FIG. 9, it is preferable that a handle 70 be sewn directly into the apparatus. The handle 70 is preferably made of plastic so as to be lightweight and inexpensive. Handle 70 is preferably sewn around a lateral netting material strip 72. Extending from the top edge of netting 12b are extensions 74 which loop through ring 78 with hook 78a affixed thereon. Buckle 76 is provided to adjust the overall length of extension 74 once hooks 78a have engaged with their respective clamps 23. Details of the structure for securement of the cargo storage apparatus to the side walls 20 of truck 50 will be discussed in detail in connection with FIGS. 6 and 7 below.

Now referring to FIGS. 1 and 3, an additional divider member 14 may be utilized to divide the storage compartment created within netting 12. Divider member 14 is secured to top edge 12b and lower edge 12a of netting 12 via clips 14a. Divider member 14 is preferably made of the same material as netting 12 and is of a size that substantially corresponds to the cross-sectional shape through the volume created by netting 12. Divider 14 may be secured to any part of netting 12 to divide the storage region created by netting 12 into variably sized sub-compartments.

Figure 4:
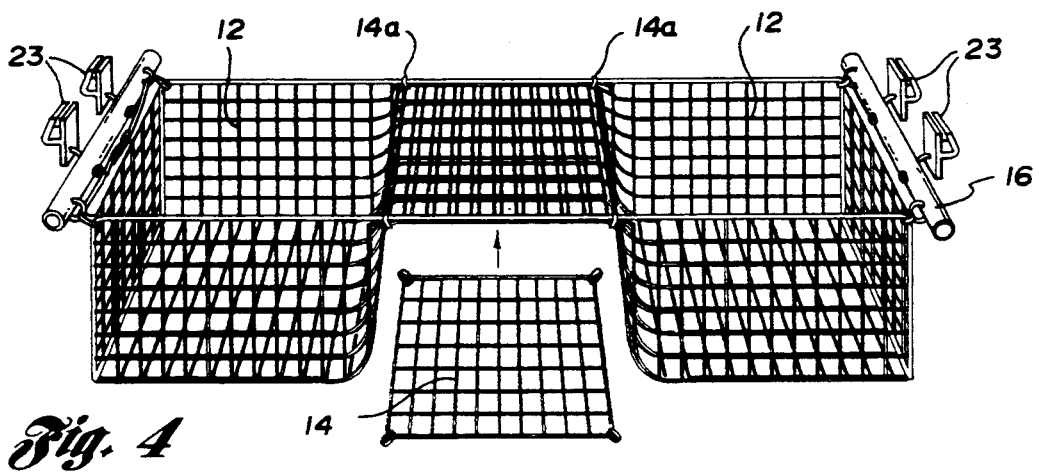
FIG. 4 is a side perspective view of the cargo storage apparatus of the present invention with the divider member affixed to the central portion of the apparatus to create two separate storage areas.

Now turning to FIGS. 2 and 4, the divider member 14 may be used in an alternative way to create two individual storage regions. This feature is accomplished by placing the divider member flat and below netting 12 and affixing clips 14a to both upper edge 12b and lower edge 12a at all four points of divider member 14. Material above divider member 14 will be gathered up and lifted off floor 52 of truck 50. As a result, two separate storage compartments may be created. The placement and arrangement of the compartments in FIGS. 2 and 4 may be adjusted by changing the placement of divider member 14 on lower and upper edges of netting 12.

Figure 5:
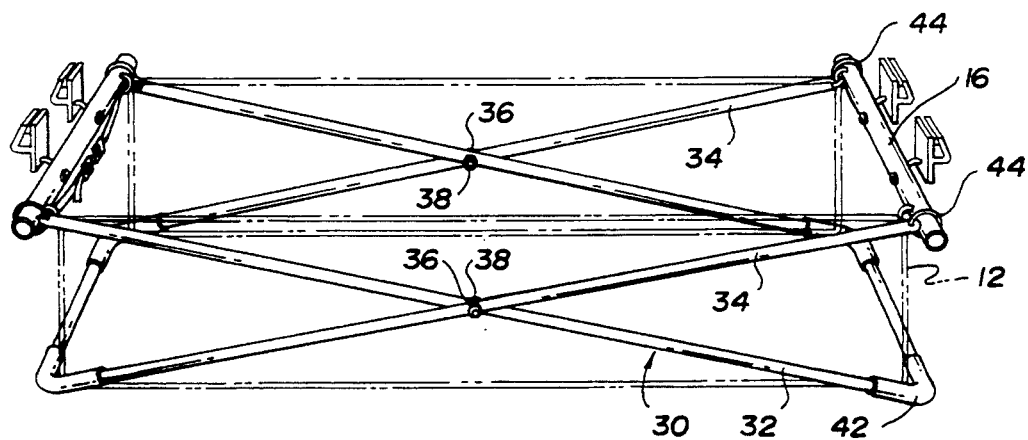
FIG. 5 is a side perspective view of an alternative embodiment of the present invention which includes a reinforcement frame.

With reference now to FIG. 5, an alternative embodiment is shown. More specifically, a support frame 30 is provided to assist the netting 12 maintain its shape and contain the cargo within the storage region. Each hanger rod 16 has additional rings 44 which engage with U-frames 32 and 34. Each frame may be a unitary structure or may consist of three linear members connected together to form the U-shape frame. The two U-shaped frame members 32 and 34 are secured together by a screw 36 and nut 38 arrangement to form a cross. When the frame members are affixed to rings 44 and secured by screws 36 and nuts 38, and hanger rod 16 is affixed to the side walls 20 of truck 50, a rigid outer frame 30 may be created. This outer frame 30 serves to provide support for the overall cargo storage apparatus as well as assist netting 12 in containment of the cargo contained therein.

Figure 6:
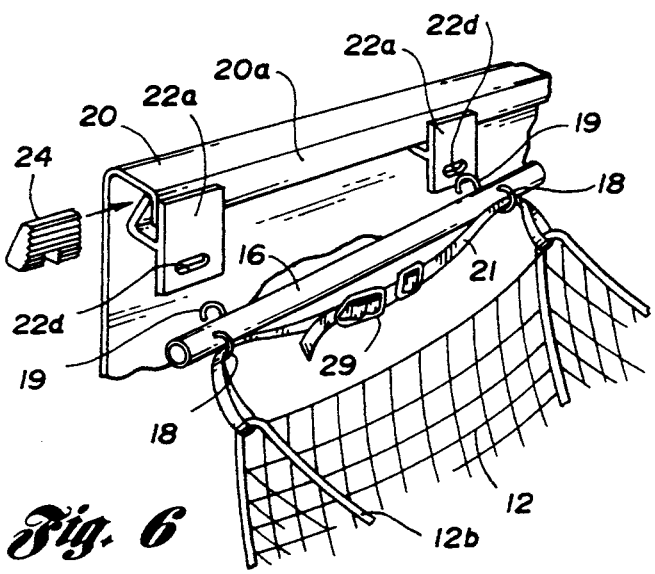
FIG. 6 is a close up perspective view of the present invention showing the attachment of the cargo storage apparatus to the side wall of a vehicle.
Figure 10:
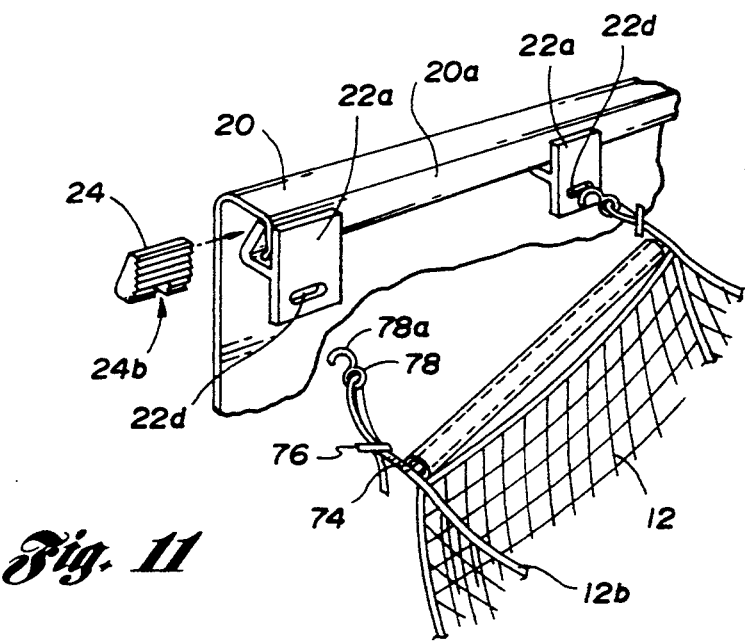
FIG. 10 is a close-up perspective view of the preferred embodiment of the present invention showing attachment of the cargo storage apparatus to the side wall of a vehicle.
Figure 11:
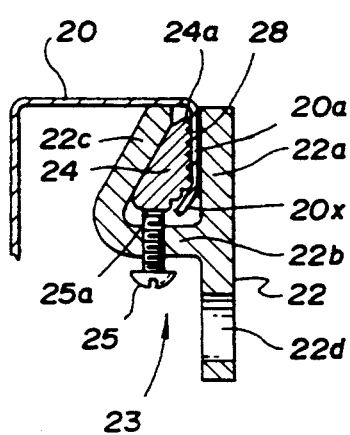
FIG. 11 is a cross-sectional view of the clamp portion of the preferred embodiment of the present invention showing the clamp affixed to a curved side wall of a truck.

FIGS. 6, 7, 10 and 11 further show the structure for securing the cargo storage apparatus of the present invention to a truck's side walls 20. In the installation of the cargo storage apparatus 10 of the present invention, the first step is to secure clamps 23 to the side walls of truck 50. Two of such clamps are shown in FIG. 6 which correspond to one truck wall. Two other clamps are employed for the facing side wall. It is preferable to have a set of four clamps (two clamps per side) to secure the cargo storage apparatus to the side walls 20. However, other variations, such as a set of six clamps (three per side), may be used according to the size of the truck and overall requirements. As shown in FIGS. 10 and 11, truck overhang wall 20a is often curved inward at point 20x as opposed to a flat surface as in FIGS. 6 and 7 and may easily accommodate the clamps.

Figure 7:
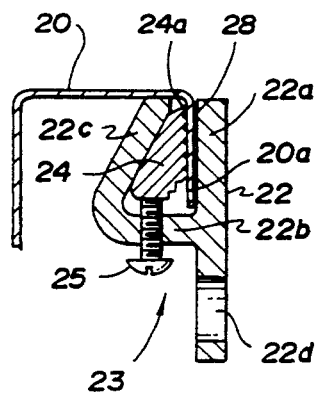
FIG. 7 is cross-sectional view of the clamp portion of the present invention showing how the clamp is affixed to a flat side wall of the truck.

Turning now to FIG. 7 and 11, the structure of clamp 23 is shown in detail in relation to side wall 20. Clamp 23 has a Y-shaped structure 22 where section 22a abuts against the surface of side wall overhang 20a that faces toward the inside of truck 50 while section 22c bears on the underside of side wall 20. Sections 22c and 22b serve as a backing plate while section 22a serves as a facing plate. In FIG. 11, point 20x of overhang 20a sits below insert member 24. A thin rectangular piece of plastic 28 or the like is adhered to the surface of section 22a that contacts overhang 20a. Strip 28 prevents scratching of the exterior of truck walls and assists in preventing section 22a from sliding down along overhang 20a when in the fully clamped position. Strip 28 prevents sliding by creating friction between overhang 20a and section 22a.

Section 22c is disposed at an angle relative to section 22a and overhang 20a. Between section 22c and the outside surface of overhang 20a resides insert member 24. As seen in FIG. 6, insert member 24 is inserted once the Y-shaped structure 22 is placed in abutting relationship with side wall 20. In FIG. 10, which shows a curved overhand wall, Y-shaped member 22 is first inserted over the overhang 20a including point 20x. Insertion of insert member 24 between Y-shaped member 22 and overhang 20a with point 20x causes Y-shaped member 22 to be loosely secured to the overhang 20a. At this point, Y-shaped member 22 cannot be removed from overhang 20a creating a locking action. In contrast, connection to an overhang 20a that is flat, as in FIG. 7, cannot create a locking effect. The locking effect is preferable and is usually effectuated because most trucks today have overhang portions 20a that are curved inward with point 20x of the kind shown in FIG. 11.

Figure 12:
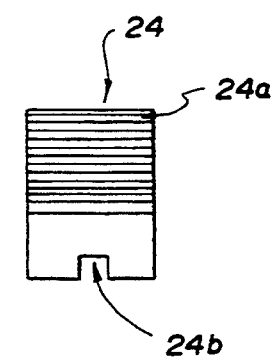
FIG. 12 is a front view of the wedge portion of the clamp of the cargo storage apparatus of the present invention.

Screw 25 is threadably inserted through section 22b of Y-shaped member 22 to communicate with the lower surface of insert member 24. As screw 25 is threaded into section 22b, insert member 24 slides up along the inner surface of section 22c until it is snugly fitted against overhang 20a. Insert member 24 also includes teeth 24a to provide a grip onto overhang 20a. The structure of insert member 24 moving vertically at an angle along section 22c, provides secure, vibration-free clamping on overhang 20a. As shown in FIG. 10 and particularly FIG. 12, insert member 24 preferably includes a notch 24b in the central portion of its lower edge. Upon insertion of insert member 24 between Y-shaped member 22 and overhang 20a notch 24b substantially aligns with screw 25. When screw 25 is threaded into section 22b, the tip portion 25a of screw 25 will engage with notch 24b. Such engagement causes insert member 24 to be connected to Y-shaped member 22 via screw 25. Notch 24b is particularly useful when sliding clamps 23 along overhang 20a. It is preferable to thread screw 25 enough to engage notch 24b but loose enough to permit sliding of the clamp 23 during installation. Since insert member 24 and Y-shaped member 22 are connected via screw 25 and notch 24b, insert member 24 will not separate from Y-shaped member 22 which would cause detachment of a clamp. Similarly, over time, vibration can jar the insert member 24 loose. However, this cannot occur if a notched insert member is employed according to the present invention. Such a clamping system is an advance over the prior art structures which are apt to loosen over time and disengage with the clamped surface.

Referring both to FIGS. 6 and 7, once clamps 23 are secured to overhang 20a in positions that substantially correspond to the spacing of hooks 19 situated on hanger rods 16 in one embodiment, or hooks 78a, as shown in FIG. 10 in the preferred embodiment, installation of the cargo storage apparatus of the present invention can be completed. In the preferred embodiment, two clamps 23 are secured to each side wall overhang 20a. Each of the clamps 23 have an aperture 22d in Y-shaped member 22. Upon securement of the clamps 23 to overhang 20a, the axis of aperture 22d will be substantially parallel to the ground. Hooks 19 of hanger rods 16 or hooks 78a, connected to extensions 74, are then inserted into apertures 22d enabling hanger rod 16 or extensions 74 to hang from clamps 23. The other set of hooks 19 in FIG. 6 and hooks 78a, as shown in FIG. 10, and apertures 22d associated with the facing side wall 20 of the truck 50 are similarly assembled.

In the installation of the cargo storage apparatus of the present invention, the width of the truck bed (the distance between the side walls) may be greater than the length of netting 12. In accordance with one embodiment of the invention shown in FIG. 6, an additional strap 21 is provided on one end of netting 12. The length of strap 21 may be adjusted by buckle 29. In the preferred embodiment of FIGS. 9 and 10, each extension 74 on the corners of netting 12 may be adjusted individually by buckles 76. Such an adjustment of buckles is important for maintaining upper edge 12b taut across the width of the truck bed as well as customizing the fit of the cargo storage apparatus to a specific sized truck bed. Upon installation, the cargo storage apparatus of the present invention has a low profile and allows for the concurrent use of other flatbed equipment, such as a soft cover top 40 as seen in FIG. 1.

The structure of present invention, as particularly shown in the embodiment of FIG. 9, enables easy and simple removal and transport of cargo storage apparatus 10. For removal, each hook 78a of the preferred embodiment or hook 19 of the embodiment shown in FIG. 3, is extracted from its corresponding clamp. then, handles 70 or the hanger rods 16 are brought together to form a basket with the cargo stored therein. In this arrangement, the cargo can be easily removed from a truck and transported and then easily re-installed into the truck.

Figure 8:
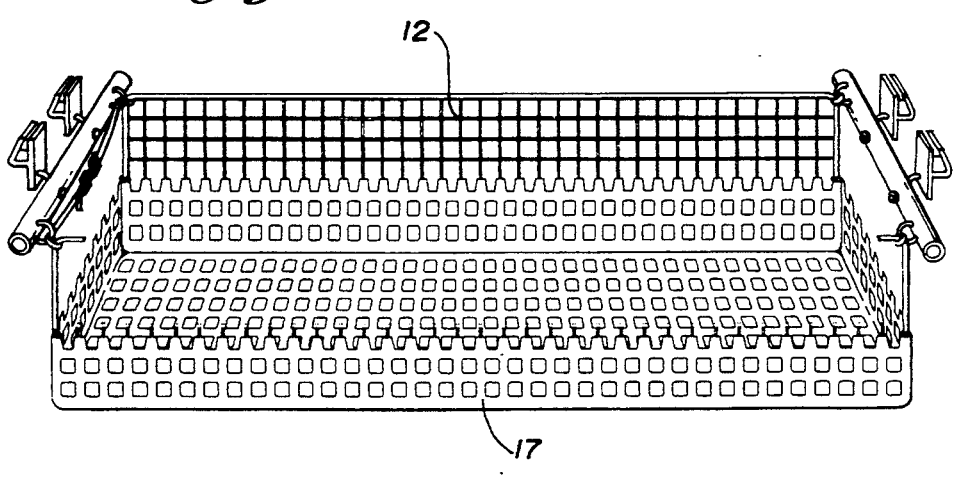

In a further embodiment of the present invention, as shown in FIG. 8, netting 12 may be provided with a plastic or rubber coating 17, preferably in the region that contacts floor 52 of the flatbed. The addition of such a coating 17 provides durability and extends the life of netting 12. Further, the presence of such a coating 17 prevents the netting 12 from sliding on the floor 52 of truck 50.

It will be appreciated by those skilled in the art that various changes and modifications can be made to the illustrated embodiments without departing from the spirit of the present invention. All such modifications and changes are intended to be covered by the appended claims.

What is claimed is:

1. An apparatus for containing cargo on a truck having two side walls, comprising:
   a flexible and collapsible container having a substantially three-dimensional rectangular shape having two opposing ends;
   two hanger rods connected to respective opposing ends of said container;
   a plurality of fasteners connected to each of said hanger rods; and
   a plurality of clamps removably secured to an overhang portion of each sidewall, each of said clamps including a portion for securing one of said plurality of fasteners.

2. The apparatus of claim 1, wherein said hanger rods are adjustably connected to said container so as to enable the adjustability of the overall length between said hanger rods when connected to said clamps.

3. The apparatus of claim 1, further comprising:
   a divider member attached to said container to separate said container into a plurality of sub-compartments.

4. The apparatus of claim 1, further comprising:
   a support frame connected to said hanger rods and disposed about said container to provide said container with additional containment capabilities.

5. The apparatus of claim 1, wherein said flexible container is manufactured of nylon netting.

6. The apparatus of claim 5, wherein said nylon netting is coated with a plastic coating.

7. The apparatus of claim 1, wherein each of said plurality of clamps have:
   a facing plate having an aperture therein;
   a backing plate connected to said facing plate;
   a wedge member disposed between said backing plate and said overhang portion;
   a screw threadably inserted through said backing plate so as to communicate with said wedge member;
   whereby said overhang portion is clamped between said wedge member and said facing plate by insertion of said screw.

8. The apparatus of claim 7, wherein said wedge member has a notch in its region of communication with said screw to prevent said wedge member from being removed from between said overhang portion and said backing plate.

9. The apparatus of claim 7, wherein insertion of said wedge between said backing plate and said overhang portion secures one of said clamps to said overhang portion when said overhang portion is curved upward and toward each side wall.

* * * * *